US008234063B2

(12) United States Patent
Dhanani

(10) Patent No.: US 8,234,063 B2
(45) Date of Patent: Jul. 31, 2012

(54) NAVIGATION SYSTEM WITH LOCATION PROFILING AND METHOD OF OPERATION THEREOF

(75) Inventor: Salman Dhanani, Mountain View, CA (US)

(73) Assignee: Telenav, Inc., Sunnyvale, CA (US)

( * ) Notice: Subject to any disclaimer, the term of this patent is extended or adjusted under 35 U.S.C. 154(b) by 244 days.

(21) Appl. No.: 12/642,688

(22) Filed: Dec. 18, 2009

(65) Prior Publication Data

US 2011/0153191 A1    Jun. 23, 2011

(51) Int. Cl.
*G01C 21/32*    (2006.01)

(52) U.S. Cl. ........................ 701/424; 701/410

(58) Field of Classification Search .......... 701/200–202, 701/210–211, 424, 400, 410
See application file for complete search history.

(56) References Cited

U.S. PATENT DOCUMENTS

| 6,308,133 | B1 | 10/2001 | Loffert et al. |
| 7,289,904 | B2 | 10/2007 | Uyeki |
| 7,363,357 | B2 | 4/2008 | Parupudi et al. |
| 2002/0111154 | A1 | 8/2002 | Eldering et al. |
| 2002/0128774 | A1 | 9/2002 | Takezaki et al. |
| 2004/0236505 | A1 | 11/2004 | Entenmann et al. |
| 2005/0015197 | A1* | 1/2005 | Ohtsuji et al. ............... 701/202 |
| 2005/0027446 | A1* | 2/2005 | Ishibashi et al. ............. 701/209 |
| 2005/0216185 | A1 | 9/2005 | Takezaki et al. |
| 2005/0288859 | A1 | 12/2005 | Golding et al. |
| 2006/0002590 | A1 | 1/2006 | Borak |
| 2006/0069500 | A1* | 3/2006 | Hashizume ................... 701/209 |
| 2006/0116965 | A1 | 6/2006 | Kudo et al. |
| 2006/0276962 | A1 | 12/2006 | Yoshioka et al. |
| 2008/0114543 | A1 | 5/2008 | Vishnu |
| 2009/0248296 | A1* | 10/2009 | Tomita et al. ................. 701/204 |

OTHER PUBLICATIONS

International Search Report for Application No. PCT/US2010/059745 dated Mar. 4, 2011

* cited by examiner

*Primary Examiner* — Hussein A. Elchanti
(74) *Attorney, Agent, or Firm* — Ishimaru & Associates LLP; Mikio Ishimaru; Stanley Chang

(57) ABSTRACT

A method of operation of a navigation system with location profiling includes: calculating a routing region based on a current location for locating a device; calculating a familiarity level in the routing region; generating a routing overlay based on the familiarity level below a familiarity threshold with the routing overlay to compensate for a driver unfamiliarity in the routing region; and generating a compensation route based on the routing overlay for displaying on the device.

20 Claims, 9 Drawing Sheets

NAVIGATION SYSTEM WITH LOCATION PROFILING AND METHOD OF OPERATION THEREOF

TECHNICAL FIELD

The present invention relates generally to a navigation system, and more particularly to a navigation system with location profiling.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile navigation devices, new and old paradigms begin to take advantage of this new device space. There are many technological solutions to take advantage of this new device location opportunity. One existing approach is to use location information to provide navigation services such as a global positioning system (GPS) navigation system for a car or on a mobile device such as a cell-phone, portable digital assistant (PDA) or portable computer.

The ability for users to use location information to generate a navigation route does not automatically translate to providing a safe, quick, and effective method of navigation for each individual. An effective means to make navigation systems more useful to individuals is still required.

Thus, a need remains for a navigation system with location profiling to efficiently create, manage, and present navigation information in a timely fashion for a variety of circumstances and situations. In view of the ever-increasing added features desired by consumers in their mobile client devices, it is more and more critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: calculating a routing region based on a current location for locating a device; calculating a familiarity level in the routing region; generating a routing overlay based on the familiarity level below a familiarity threshold with the routing overlay to compensate for a driver unfamiliarity in the routing region; and generating a compensation route based on the routing overlay for displaying on the device.

The present invention provides a navigation system including: a location unit for calculating a current location for a device; a profile engine, coupled to the location unit, which includes a calculate routing region module for calculating a routing region based on the current location, a get driver history module for calculating a familiarity level in the routing region, and a generate routing overlay module for generating a routing overlay having supplemental routing information based on the familiarity level being below a familiarity threshold with the routing overlay to compensate for an unfamiliarity of the driver at the routing region; a routing engine, coupled to the profile engine for generating a compensation route based on the routing overlay; and a control unit, coupled to the routing engine for sending the compensation route for displaying on a device.

Certain embodiments of the invention have other aspects in addition to or in place of those mentioned above. The aspects can become apparent to those skilled in the art from a reading of the following detailed description when taken with reference to the accompanying drawings.

BEST MODE FOR CARRYING OUT THE INVENTION

Figure 1:
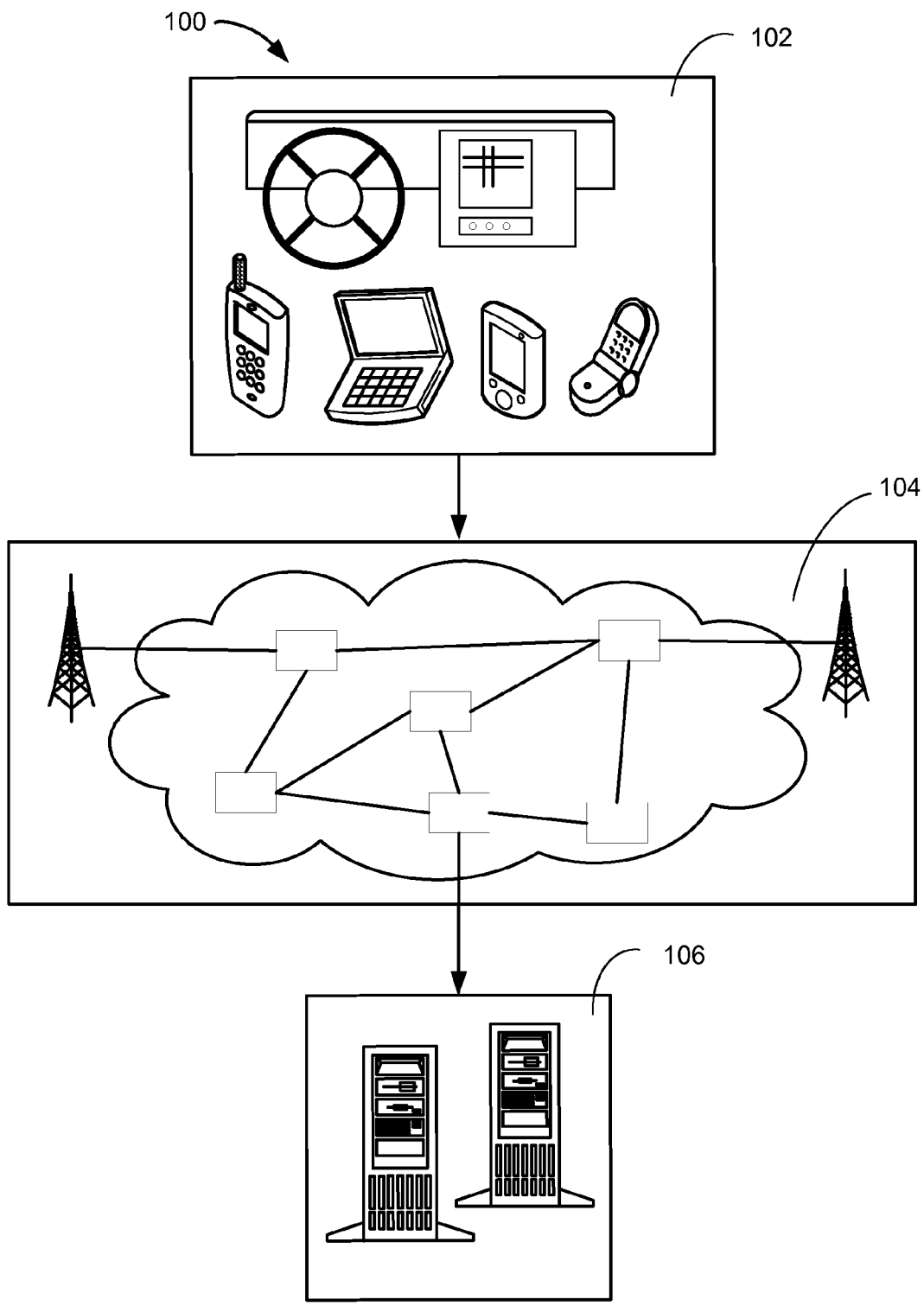
FIG. 1 is a navigation system with location profiling in a first embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail. Likewise, the drawings showing embodiments of the system are semi-diagrammatic and not to scale and, particularly, some of the dimensions are for the clarity of presentation and are shown greatly exaggerated in the drawing FIGs.

Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, or a combination thereof.

Referring now to FIG. 1, therein is shown a navigation system 100 with location profiling in a first embodiment of the present invention. The navigation system 100 with location profiling includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can couple to the communication path 104 to communicate with the second device 106. The first device 102 can also be a server type device as described as the second device 106.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

For example, the second device 106 can be any of a variety of centralized or decentralized computing devices including a computer, grid computing resources, a virtualized computer resource, cloud computing resource, routers, switches, peer-to-peer distributed computing devices, or a combination thereof, having means to couple with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the second device 106 is shown in a single location, although it is understood that the server can be centralized or decentralized and located at different locations. For example, the second device 106 can represent a real or virtual server in a single computer room, distributed across different rooms, distributed across different geographical locations, embedded within a telecommunications network, or virtualized servers within one or more other computer systems including grid or cloud type computing resources.

Also for illustrative purposes, the navigation system 100 with location profiling is shown with the second device 106 as a non-mobile computing device, although it is understood that the second device 106 can be different types of computing devices. For example, the second device 106 can also be a mobile computing device, such as notebook computer, another client device, or a different type of client device.

Further for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

Figure 2:
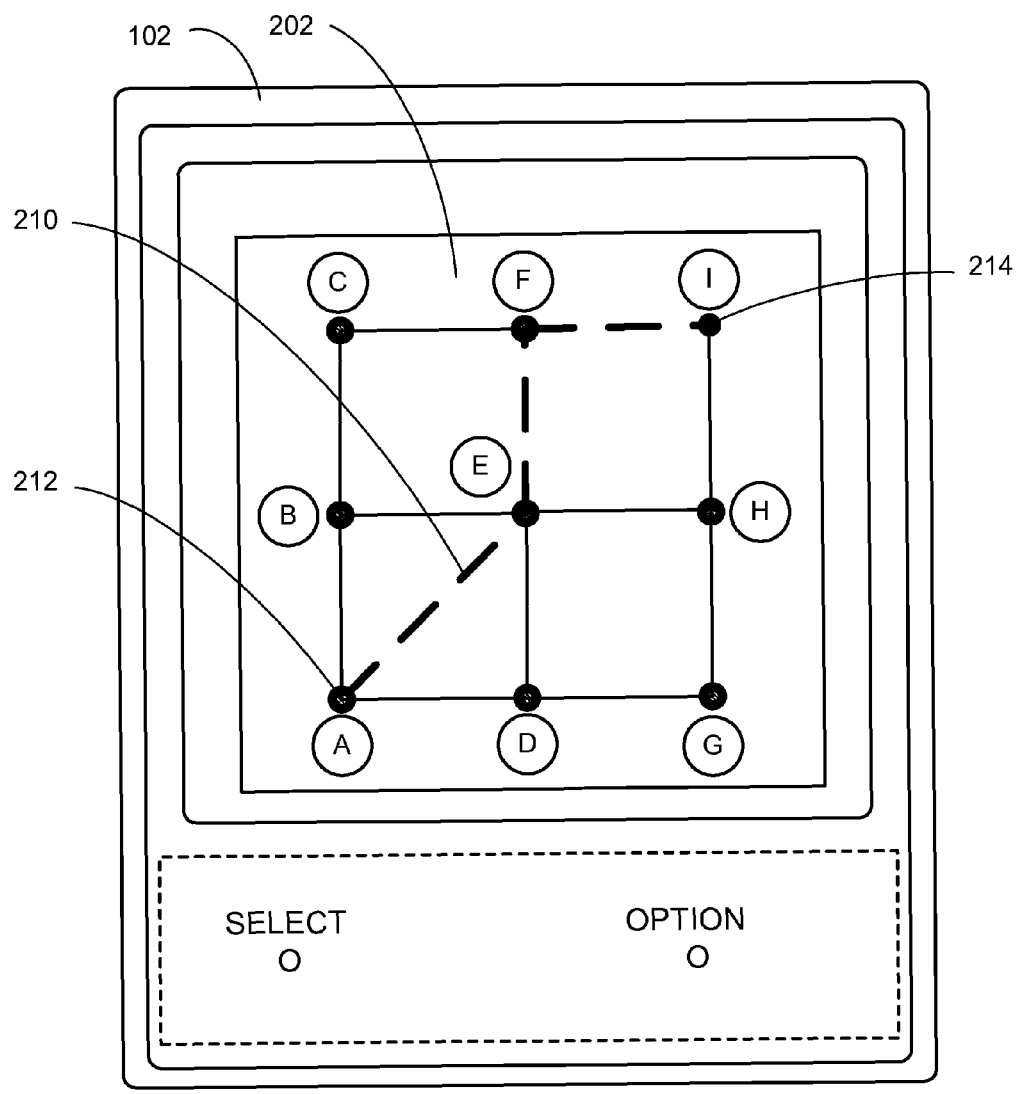
FIG. 2 is a display interface of a first example of the navigation system of FIG. 1.

Referring now to FIG. 2, therein is shown a display interface 202 of a first example of the navigation system 100 of FIG. 1. The display interface 202 can present a compensation route 210 between a first location 212 to a second location 214. The compensation route 210 is the current route calculated by the navigation system 100 for navigation between two locations. The compensation route 210 can include the fastest route, the most inexpensive route, the shortest route, or any combination thereof.

The compensation route 210 can include a series of nodes and edges that define a path between two locations. The nodes represent intersections and the edges represent road segments. For example, the compensation route 210 can represent the route between the first location 212 and the second location 214 along the route AE-EF-FI. The compensation route 210 can be presented on the display interface 202 to allow the driver to navigate from the first location 212 to the second location 214 along the road segment AE, the intersection E, the road segment EF, the intersection F, and the road segment FI.

Figure 3:
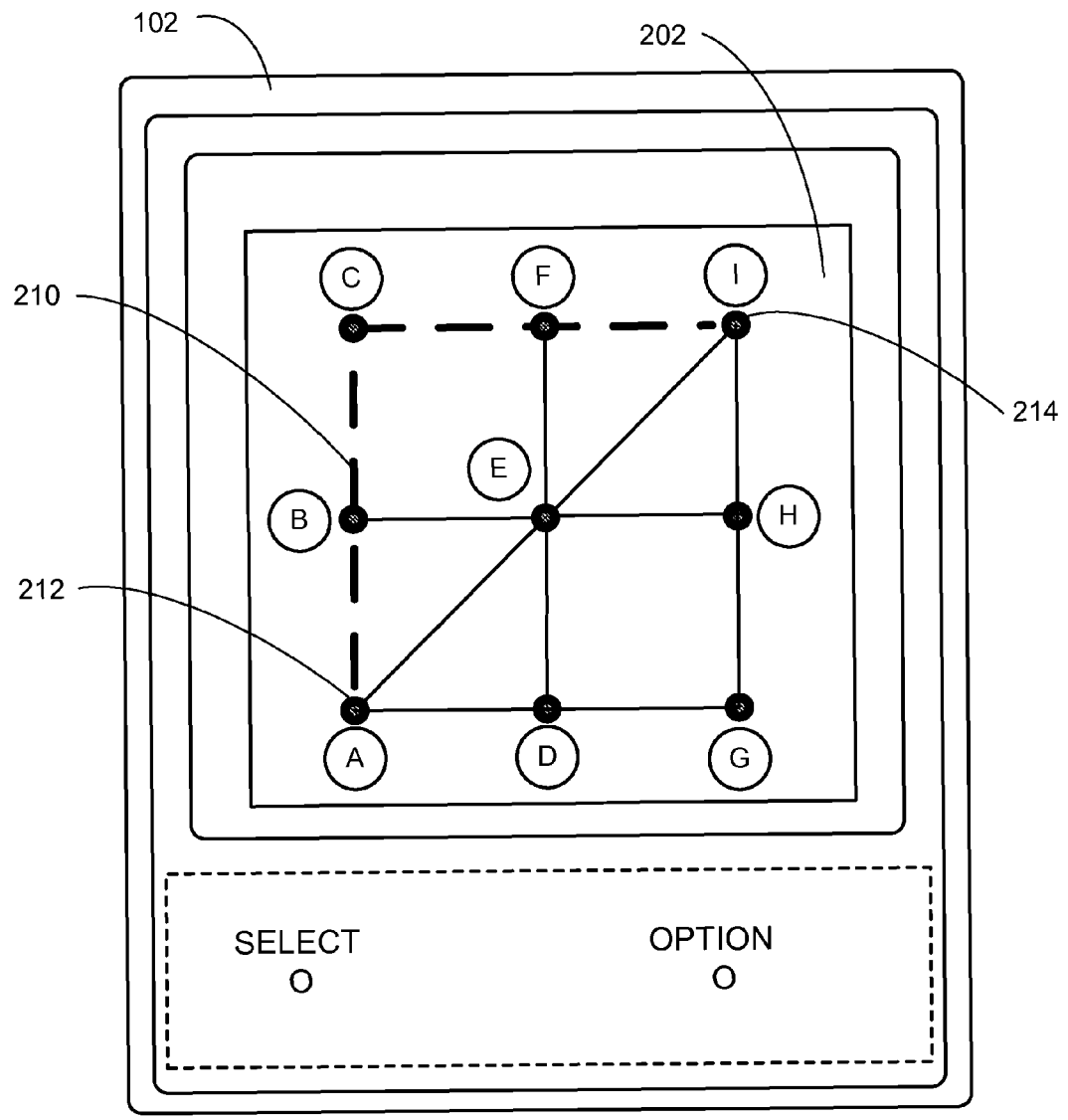
FIG. 3 is an illustration of a second example of the navigation system of FIG. 1.

Referring now to FIG. 3, therein is shown an illustration of a second example of the navigation system 100 of FIG. 1. The driver is in an unfamiliar location and can require simplified navigation routing information.

For example, the navigation system 100 can calculate the compensation route 210 from the first location 212 to the second location 214 along major roads to simplify navigation and to avoid a residential road segment represented by the edge AE and a curvy road segment represented by the edge EI. The display interface 202 shows the compensation route 210 along the route AB-BC-CF-FI from the first location 212 to the second location 214.

In another example, the navigation system 100 can avoid routes though high crime areas, routes with bad roads, routes that are dangerous during bad weather, routes through residential areas, routes with toll roads, or any combination thereof. The navigation system 100 can favor routes that are well lit at night, scenic, well travelled, highways, or any combination thereof.

Figure 4:
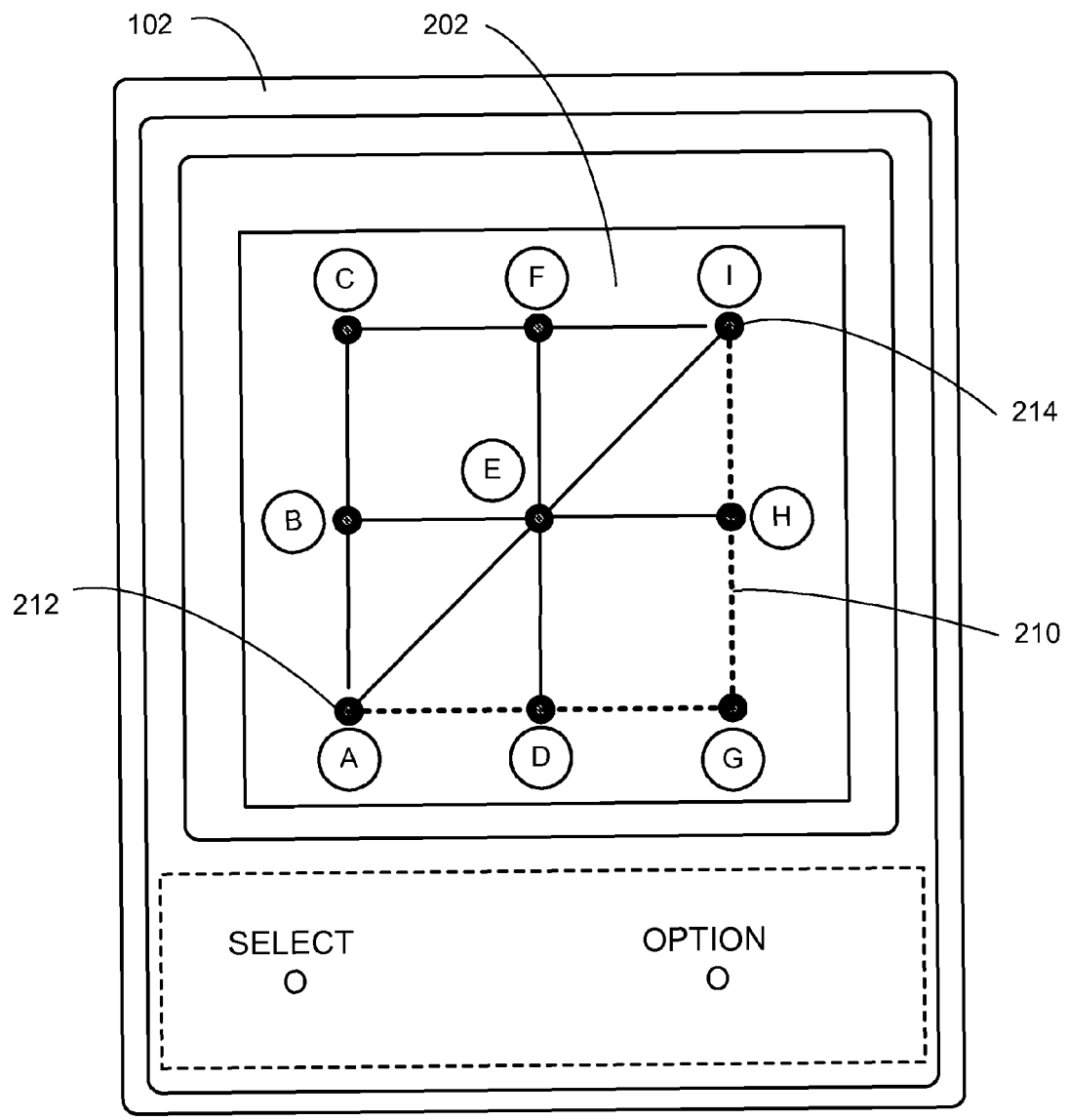
FIG. 4 is an illustration of a third example of the navigation system of FIG. 1.

Referring now to FIG. 4, therein is shown an illustration of a third example of the navigation system 100 of FIG. 1. The driver is in an unfamiliar location and navigating at night during rush hour traffic.

For example, the navigation system 100 can calculate the compensation route 210 from the first location 212 to the second location 214. The compensation route 210 can be calculated to avoid a heavy traffic road segments AE and to avoid a road segment BC where environmental information shows road construction. The display interface 202 shows the compensation route 210 along the route AD-DG-GH-HI from the first location 212 to the second location 214.

Figure 5:
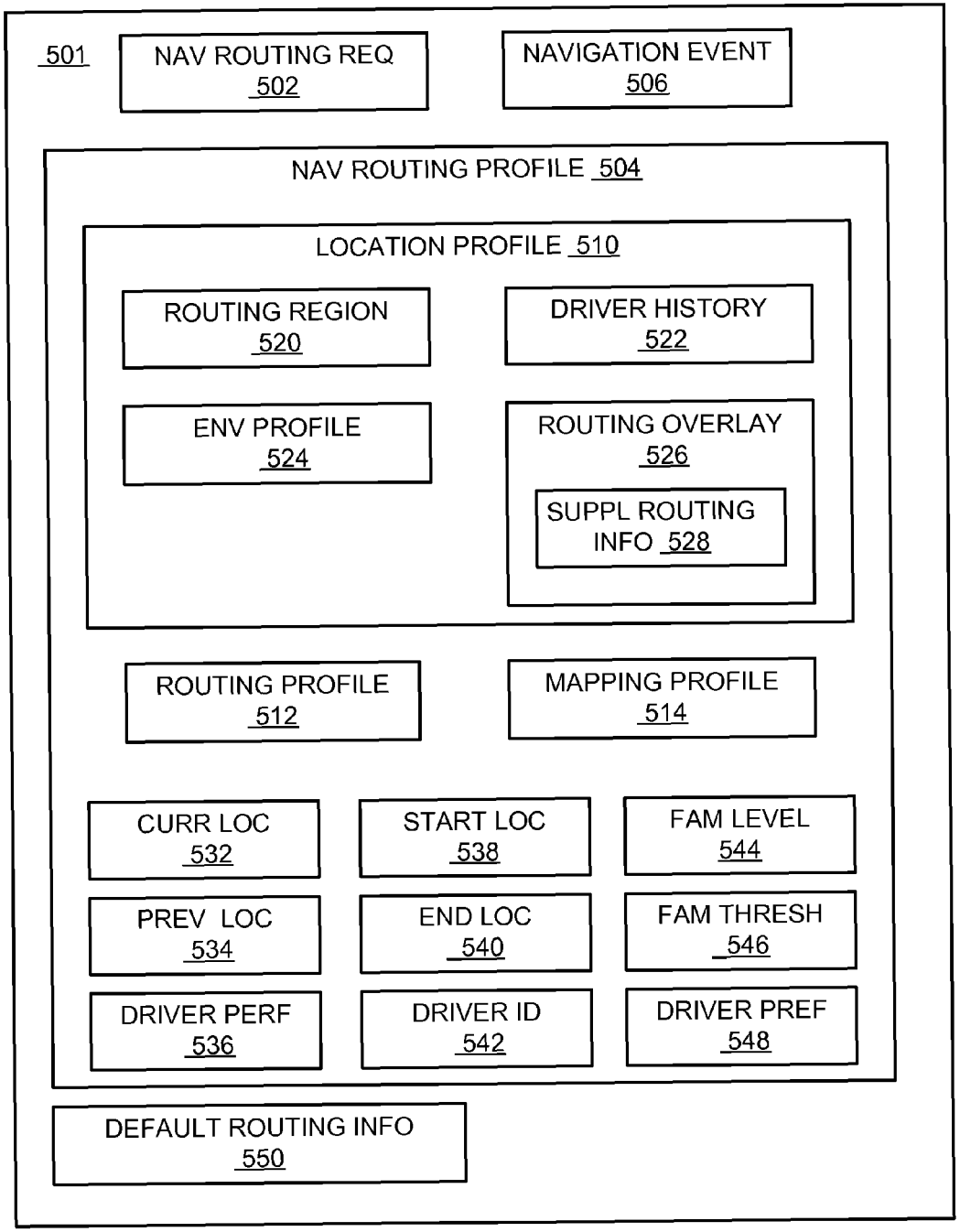
FIG. 5 is a memory map of the navigation system of FIG. 1.

Referring now to FIG. 5, therein is shown a memory map 501 of the navigation system 100 of FIG. 1. The memory map 501 can include a navigation routing request 502, a navigation routing profile 504, a navigation event 506, a location profile 510, a routing profile 512, a mapping profile 514, a routing region 520, a driver history 522, and a routing overlay 526.

The navigation routing request 502 can represent a request for the navigation system 100 to create a route between two locations. The navigation routing request 502 can include a start location 538, an end location 540, interim locations, a driver identification 542, system identification, or any combination thereof.

The navigation event 506 can represent a change in the navigational state of the navigation system 100. The navigation event 506 can include a physical location change, a speed change, a deviation from a routing command, a deviation from a displayed route, a vehicle control usage, a vehicle control setting change, a vehicle instrument change, or any combination thereof.

The navigation routing profile 504 can represent the navigation and mapping information for the route between the two locations. The navigation routing profile 504 can include the location profile 510, the routing profile 512, the mapping profile 514, or any combination thereof.

The location profile 510 can represent information about a location that can be used to help create the route between the two locations. The location profile 510 can include information about streets, intersections, routes, areas, or any combination thereof associated with a location. The location profile 510 can include the routing region 520, the driver history 522, an environment profile 524, the routing overlay 526, or any combination thereof.

The navigation system 100 with location profiling is location sensitive because it uses the location profile 510 to determine navigation behavior. The navigation system 100 can maintain the location profile 510 for multiple locations. The location profile 510 contains information that can influence routing decisions in that location. The location profile 510 can include easy to drive routes, major thoroughfares, scenic routes, dangerous areas, difficult to drive areas, or any combination thereof. The navigation system 100 can calculate a different route based on the location profile 510.

The routing profile 512 can represent the route between the two locations. The routing profile 512 can include the start location 538, the end location 540, the compensation route 210, a vector maps, a node and edge weighing information, a navigation instruction, a navigation command, a routing vector status information, or any combination thereof.

The mapping profile 514 can represent the graphical mapping information for the route between the two locations. The mapping profile 514 can include location-specific mapping information, graphical display information, resolution and size-specific display tiles, vector maps, nodes, edges, or any combination thereof.

For example, the navigation system 100 can display the mapping display tiles of the mapping profile 514 that represent the location of the navigation system 100 on the display interface 202. The navigation system 100 can display different mapping display tiles representing a new location as the navigation system 100 moves along the compensation route 210 of the routing profile 512.

The routing region 520 can be an identifier that indicates the geographical area or geographical region where the routing takes place. The routing region 520 can be represented by a geographical coordinate, a regional coordinate, a pre-defined area identifier, or any combination thereof.

For example, the geographical coordinate can include a latitude-longitude coordinate pair, an X-Y coordinate pair, a polar coordinate, or any combination thereof. The regional coordinate can include known geographical regions such as city names, states, villages, provinces, area names, or any combination thereof. The pre-defined area identifier can include values related to an area such as map tiles, rectilinear grid squares, arbitrarily defined areas, or any combination thereof.

The driver history 522 can represent the driver's previous experience and performance driving in the routing region 520. The driver history 522 can include the number of times the driver has been in the routing region 520, a driver performance 536 in the routing region 520, a driver skill level, an area type, or any combination thereof.

The driver skill level can indicate the driving ability of a driver such as a new driver, an experienced driver, or any combination thereof. The area type can provide information about previous routing areas such as an urban area, a residential area, a rural area, or any combination thereof.

For example, the driver history 522 can include information showing that the driver is very experienced, but has never driven in the routing region 520. The navigation system 100 can use the driver history 522 to calculate a faster but more difficult to drive the compensation route 210.

The driver performance 536 can represent how well the driver follows or executes the compensation route 210 between two physical locations presented on the navigation system 100. For example, if the driver makes errors while following the compensation route 210, the driver performance 536 can indicate a lower level of performance for that route.

The environment profile 524 can represent the environmental factors that can influence road conditions along the compensation route 210. The environment profile 524 can include information such as a time, a weather condition, a season, a lighting condition, an icing condition, or any combination thereof. The environment profile 524 can also include location-specific environmental information such as a traffic condition, a road condition, a road construction detail, a point of interest, an event, or any combination thereof.

For example, the environment profile 524 can indicate heavy thunderstorms in the routing region 520 and can include a lower routing value for roads that are susceptible to flooding. In another example, the environment profile 524 can indicate a bridge is heavily congested with rush hour traffic. The navigation system 100 can use the information to calculate the compensation route 210 that avoids the bridge and avoids streets that are susceptible to flooding.

The routing overlay 526 can represent the relative routing values of streets and intersections in the routing region 520 to compensate for a driver's unfamiliarity within the routing region 520. The routing overlay 526 is a set of time- and location-specific routing information that can be combined with the other routing information to calculate the compensation route 210 between two locations.

The routing overlay 526 can include a supplemental routing information 528, such as a non-preferred route, a preferred route, a non-preferred area, a street weighing factor, an intersection weighing factor, a pre-defined routes, or any combination thereof. The supplemental routing information 528 represents routing information that can be applied to static routing information to produce the compensation route 210.

The memory map 501 can also include a current location 532, a previous location 534, the driver performance 536, the start location 538, the end location 540, a familiarity level 544, a familiarity threshold 546, a driver preference 548, and a default routing information 550.

The current location 532 can represent the geographical location of the navigation system 100 at a current time. The previous location 534 can represent a location where the navigation system had previously been located.

The start location 538 can represent the initial location in the compensation route 210. The end location 540 can represent a destination location in the compensation route 210. The driver identification 542 can represent a particular driver and allows the navigation system 100 to associate a driver with driver specific information.

The familiarity level 544 can indicate how much experience or familiarity the driver has with the routing region 520. The familiarity level 544 can be calculated by counting the number of times the driver has been in the routing region 520 as indicated in the driver history 522. A higher value for the familiarity level 544 can indicate that a driver is more familiar with the routing region 520. For example, if the driver history 522 shows that the driver has been to the routing region 520 multiple times, the familiarity level 544 can be higher.

The familiarity threshold 546 can indicate the familiarity level 544 that can be required to show that a driver is familiar with the routing region 520. The navigation system 100 can compare the familiarity level 544 to the familiarity threshold 546 to determine if the driver is familiar with the routing region 520. For example, the familiarity threshold 546 can indicate one or more levels of familiarity to indicate different levels of familiarity.

The familiarity level 544 the familiarity threshold 546, or a combination thereof can be fixed or change be changed manually or by the navigation system 100. For example, the nature of the routing region 520 can automatically lower the value for the familiarity threshold 546. If the routing region 520 represents a rural area with very few distractions, such as complex roadway system, heavy traffic, dense addressed locations, the familiarity threshold 546 can be set to a very low value or even set to null.

The driver preference 548 can represent the driver's preferred control settings that influence the operation of the navigation system 100. For example, to override the navigation system 100 default operation, the driver preference 548 can indicate that the driver wishes to operate the system as an unfamiliar driver even when the driver history 522 shows that a driver has been to the routing region multiple times. The driver preference 548 can also override the navigation system 100 to operate in familiar mode even if the driver is unfamiliar in the routing region 520.

The default routing information 550 can represent the static routing weights for the nodes and edges associated with the streets and intersections in the routing region 520. The default routing information 550 can be used to calculate a route between two locations based on the connections between the streets and intersections in the routing region 520 without regard to the unfamiliarity of the driver.

Figure 6:
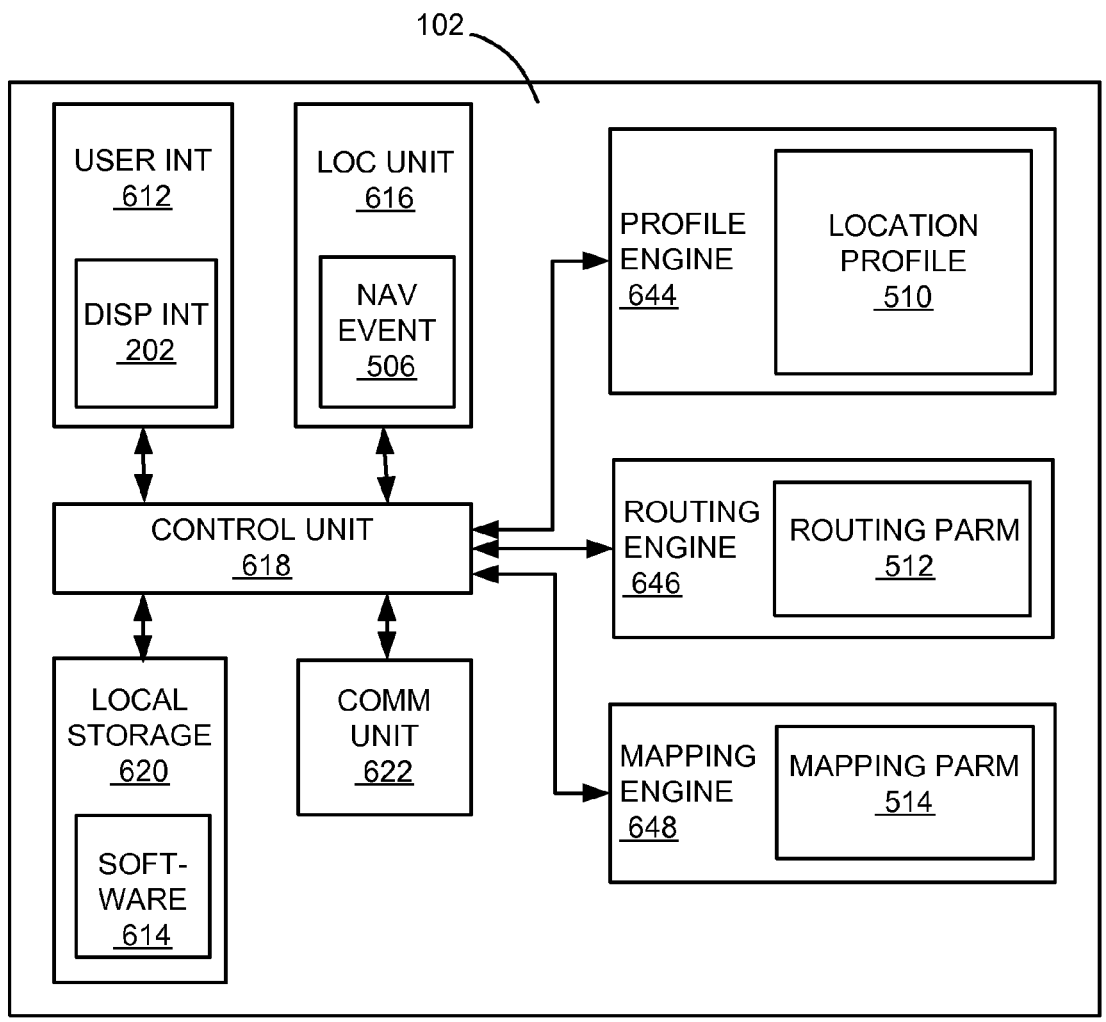
FIG. 6 is a block diagram of the first device of the navigation system of FIG. 1.

Referring now to FIG. 6, therein is shown a block diagram of the first device 102 of the navigation system 100 of FIG. 1. The first device 102, for example, can include: a user interface 612 having the display interface 202; a location unit 616, such as a global positioning system (GPS) unit; a control unit 618, such as a processor; and a software 614. The first device 102 can also include a local storage 620; a communication unit 622; a profile engine 644; a routing engine 646; and a mapping engine 648. The software 614 includes the method of operation of the navigation system 100 or portions thereof.

For illustrative purposes, the navigation system 100 with location profiling is shown with the first device 102 encompassing the functionality in a single unit, although it is understood that any individual functional module can be implemented either locally or remotely on a different device. For example, the routing engine 646 of the first device 102 can be implemented as a remote process on another device.

The user interface 612 can provide command and data inputs to the first device 102. The user interface 612 can include the display interface 202, a key pad, a touchpad, a soft-key, a keyboard, a virtual keyboard, a microphone, or any combination thereof.

The display interface 202 can present visual and audio information such as maps, text, video, images, audio commands, audio notifications, audio warning, or any combination thereof. The display interface 202 can include a flat panel display, a projector, a cathode-ray tube display, a heads up display, a speaker, a headphone set, or any combination thereof.

Presenting visual information on the display interface 202 can include displaying images, graphics, video, text, or any combination thereof on the screen or display of the display interface 202. For example, the display interface 202 can display a detailed map of the streets and intersections of the route between the two locations.

Presenting audio information on the display interface 202 can include playing voice, music, audio clips, or any combination thereof on a speaker, a headphone, or a buzzer of the display interface 202. For example, the display interface 202 can play the navigation command that instructs the driver to turn at a specific intersection.

The location unit 616 can calculate the current location 532 of FIG. 5, a heading and a speed of the first device 102. Calculating the current location 532 can be performed in several different methods depending on the type of location unit. The location unit 616 can be implemented in several ways. For example, the location unit 616 can be a GPS system, an inertial navigation system, a cell-tower location system, an accelerometer location system, or any combination thereof.

Calculating the current location 532 can include reading the location information from the GPS system. The location unit 616 can include the active and passive components, such as a microelectronic circuit, a laser gyroscope, an accelerometer, an antenna, or any combination thereof.

The location unit 616 can detect the navigation event 506 of FIG. 5. The navigation event 506 can include a location change, a speed change, a direction change, a deviation from routing command, a vehicle control usage, a vehicle control setting change, a vehicle instrument change, or any combination thereof.

The control unit 618 can execute the software 614 and can provide the intelligence of the first device 102 for interaction with the user interface 612, the display interface 202, the location unit 616, the local storage 620, the communication unit 622, the profile engine 644, the routing engine 646 and the mapping engine 648. The control unit 618 can also execute the software 614 for other functions pertinent to a navigation device.

The local storage 620 can be a volatile memory, a nonvolatile memory, an internal memory, an external memory, or a combination thereof. For example, the local storage 620 can be a nonvolatile storage such as non-volatile random access memory (NVRAM), Flash memory, disk storage, or a volatile storage such as static random access memory (SRAM).

The local storage 620 can store the software 614, a setup data, a multimedia data, a photo, a text, a sounds recording, a video, or any combination thereof for the operation of the first device 102 as a navigation device. The local storage 620 can also store the relevant information, such as a map, a route information, a traffic information, an advertisement, a point of interest (POI), a navigation routing entry, a driver information, or any combination thereof. The local storage 620 can also store a recorded information, an image, or created relevant information.

The communication unit 622 can couple with the communication path 104 to communicate with other devices. The communication unit 622 can include active and passive components, such as a microelectronic circuit, a transmitter, a receiver, a waveguide, an optical emitter, an optical receiver, an antenna, or any combination thereof.

The profile engine 644 can generate, store, update, delete, and retrieve the location profile 510 of FIG. 5 including the routing profile 512 of FIG. 5 with the supplemental routing information 528 of FIG. 5. The profile engine 644 can be implemented as a hardware, software, or combination hardware and software component of the first device 102. The profile engine 644 can be an integrated component of the first device 102 or a distinct separate component that provides access to the location information. For example, the profile engine 644 can be implemented as a software module that accesses location information stored in the local storage 620.

The routing engine 646 can calculate, store, update, and retrieve the routing profile 512 using the navigation routing profile 504 and the location profile 510. The routing engine 646 can be implemented as a hardware, software, or combination component. For example, the routing engine 646 can be implemented as software running on the control unit 618 accessing the navigation routing profile 504 and the location profile 510 stored in the local storage 620.

The mapping engine 648 can calculate, store, update, and retrieve the mapping profile 514 for the routing profile 512. The mapping engine 648 can be implemented as a hardware, software, or combination component. For example, the mapping engine 648 can be implemented as software running on the control unit 618 accessing a mapping database stored in the local storage 620.

Figure 7:
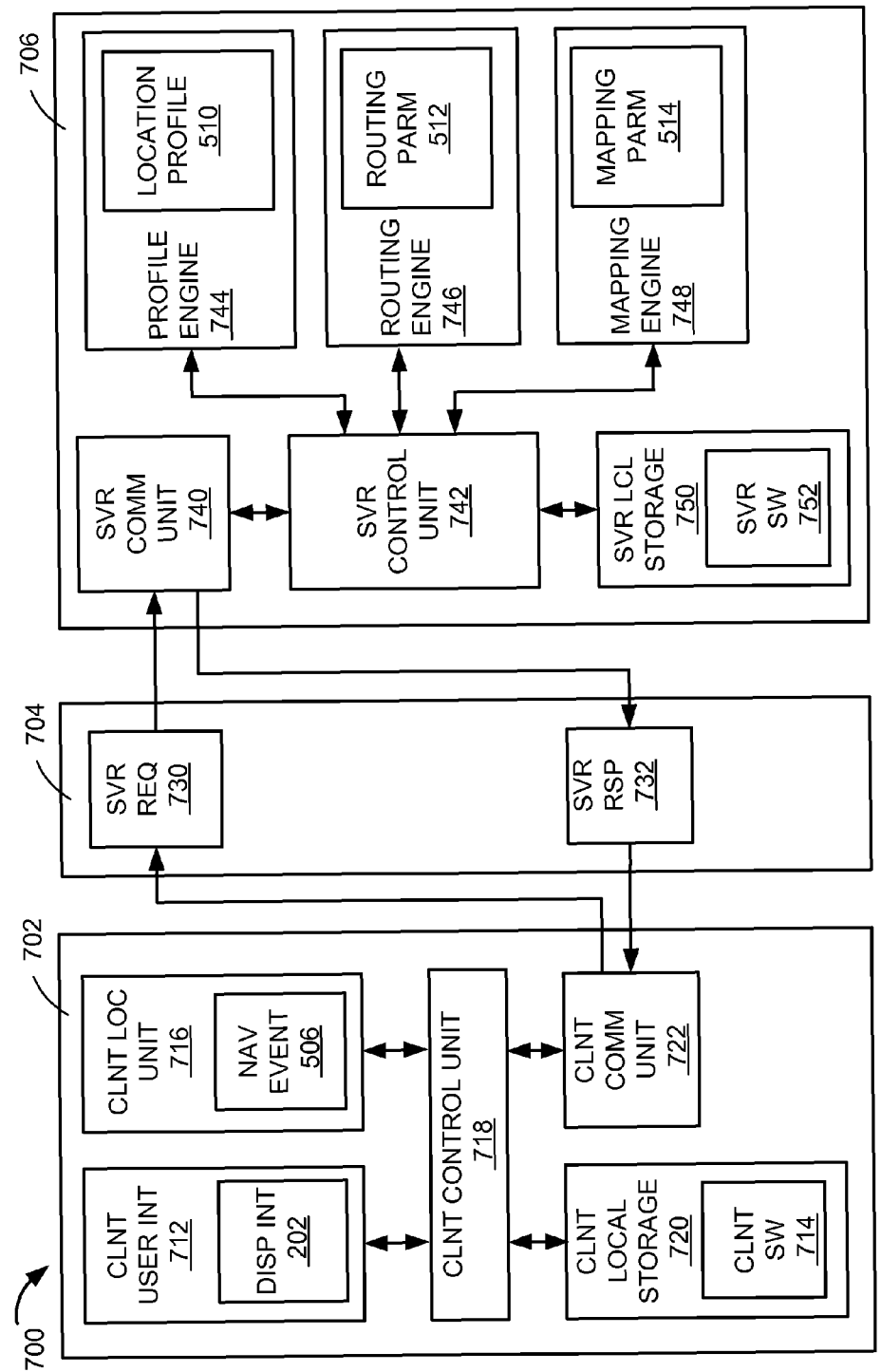
FIG. 7 is a block diagram of a navigation system with location profiling in a second embodiment of the present invention.

Referring now to FIG. 7, therein is shown a block diagram of a navigation system 700 with location profiling in a second embodiment of the present invention. FIG. 7 shows a multiple device embodiment of the navigation system 700 with location profiling where navigation functionality can be distributed between a first device 702 and a second device 706. The first device 702 can communicate with the second device 706 over a communication path 704.

The navigation system 700 can represent the navigation system 100 of FIG. 1. The first device 702 can represent the first device 102 of FIG. 1. The second device 706 can represent the second device 106 of FIG. 1. The communication path 704 can represent the communication path 104 of FIG. 1.

For example, the second device 706 can be a particularized machine, such as a mainframe, a server, a cluster server, rack mounted server, or a blade server, or as more specific examples, an IBM System z10™ Business Class mainframe or a HP ProLiant ML™ server. Yet another example, the first device 702 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 700 is shown with the first device 702 as a client, although it is understood that the navigation system 700 can have the first device 702 as a different type of device. For example, the first device 702 can be a server. For convenience to describe an example of the present invention, the first device 702 will be described as a client.

Also for illustrative purposes, the navigation system 700 is shown with the second device 706 as a server, although it is understood that the navigation system 700 with location profiling can have the second device 706 as a different type of device. For example, the second device 706 can be a client. For convenience to describe an example of the present invention, the second device 706 will be described as a server.

The first device 702, such as a client, can send a server request 730 to the second device 706 over the communication path 704. The second device 706, such as a server, can send a server response 732 to the first device 702 over the communication path 704. The first device 702 can present the visual and audio navigation and routing information on the display interface 202 of FIG. 2.

The first device 702 can include, for example, a client user interface 712 with the display interface 202, a client location unit 716, a client control unit 718, such as a processor, a client software 714, a client local storage 720, and a client communication unit 722. The client software 714 includes the method of operation of the navigation system 700 or portions thereof.

The client user interface 712 is functionally equivalent to the user interface 612 in FIG. 6. The client location unit 716 is functionally equivalent to the location unit 616 in FIG. 6. The client control unit 718 is functionally equivalent to the control unit 618 in FIG. 6. The client software 714 is functionally equivalent to the software 614 of FIG. 6. The client local storage 720 is functionally equivalent to the local storage 620 in FIG. 6. The client communication unit 722 is functionally equivalent to the communication unit 622 in FIG. 6.

The client user interface 712 can provide command and data inputs to the first device 702. The client user interface 712 can include the display interface 202, a key pad, a touchpad, soft-keys, a keyboard, a virtual keyboard, a microphone, or any combination thereof, to provide data and command inputs to the first device 702.

The display interface 202 can present visual and audio information such as maps, text, video, images, audio commands, audio notifications, audio warning, or any combination thereof. The display interface 202 can include a flat panel display, a projector, a cathode-ray tube display, a heads up display, a speaker, a headphone, a buzzer, or any combination thereof.

Presenting visual information on the display interface 202 can include displaying images, graphics, video, text, or any combination thereof on the screen or display of the display interface 202. Presenting audio information on the display interface 202 can include playing voice, music, audio clips, or any combination thereof on the display interface 202.

The client location unit 716 can calculate the current location 532 of FIG. 5 and be implemented in many ways. For example, the client location unit 716 can be a global positioning system (GPS), inertial navigation system, cell-tower location system, accelerometer location system, or any combination thereof. The client location unit 716 can include the active and passive components, such as a microelectronic circuit, a laser gyroscope, an accelerometer, an antenna, or any combination thereof.

The client location unit 716 can detect the navigation event 506. The navigation event 506 can include location change, speed change, deviation from routing command, vehicle control usage, vehicle control setting change, vehicle instrument change, or any combination thereof.

The client control unit 718 can execute the client software 714 and can provide the intelligence of the first device 702 for interaction with the client user interface 712, the display interface 202, the client location unit 716, the client local storage 720, the client communication unit 722, a profile engine 744, a routing engine 746, and a mapping engine 748. The client control unit 718 can also execute the client software 714 for other functions pertinent to a navigation device.

The client local storage 720 can be a volatile memory, a nonvolatile memory, an internal memory, an external memory, or a combination thereof. For example, the client local storage 720 can be a nonvolatile storage such as nonvolatile random access memory (NVRAM), Flash memory, disk storage, or a volatile storage such as static random access memory (SRAM).

The client local storage 720 can store the client software 714, a setup data, a multimedia data, a photo, a text, a sound recording, a video, and other data for the operation of the first device 702 as a navigation device. The client local storage 720 can also store the relevant information, such as a map, a route information, a traffic information, an advertisement, a point of interest (POI), a navigation routing entry, a driver information, or any combination thereof.

The client communication unit 722 can couple with the communication path to communicate with other devices. The client communication unit 722 can include active and passive components, such as a microelectronic circuit, a transmitter, a receiver, a waveguide, an optical emitter, an optical receiver, an antenna, or any combination thereof.

The second device 706 can include a number of units, for example, a server control unit 742 such as a processor, a server software 752, a server local storage 750, a server communication unit 740, the profile engine 744, the routing engine 746, and the mapping engine 748. The server software 752 includes the method of operation of the navigation system 700 or portions thereof.

The profile engine 744 is functionally equivalent to the profile engine 644 of FIG. 6. The routing engine 746 is functionally equivalent to the routing engine 646 of FIG. 6. The mapping engine 748 is functionally equivalent to the mapping engine 648 of FIG. 6.

For illustrative purposes, the navigation system 700 is shown with the second device 706 described with discrete functional modules. However, it is understood that the navigation system 700 can have the second device 706 in a different configuration.

For example, the profile engine 744, the routing engine 746, and the mapping engine 748 may not be discrete functional modules but may have one or more of the aforementioned modules combined into one functional module. In another example, the second device 706 can be implemented as discrete functional modules that are implemented in one or more computing elements distributed across a network in a cloud computing configuration.

The server control unit 742 can execute the server software 752 and can provide the intelligence of the second device 706 for interaction with the first device 702, the profile engine 744, the routing engine 746, the mapping engine 748, and the server local storage 750 the communication system of the communication path 704 via the server communication unit 740.

The profile engine 744 can generate, store, update, delete, and retrieve the location profile 510 of FIG. 5. The profile engine 744 can be implemented as a hardware, software, or combination hardware and software component of the second device 706. The profile engine 744 can be an integrated component of the second device 706 or a distinct separate component that provides access to the location profile information. For example, the profile engine 744 can be implemented as a software module that accesses location information stored in the server local storage 750.

The routing engine 746 can calculate, store, update, delete, and retrieve the routing profile 512 of FIG. 5 using the navigation routing profile 504 and the location profile 510. The routing engine 646 can be implemented as a hardware, software, or combination component. For example, the routing engine 746 can be implemented as software running on the server control unit 742 accessing the navigation routing profile 504 and the location profile 510 stored in the server local storage 750.

The mapping engine 748 can calculate, store, update, delete, and retrieve the mapping profile 514 for the routing profile 512. The mapping engine 748 can be implemented as a hardware, software, or combination component. For example, the mapping engine 748 can be implemented as software running on the server control unit 742 accessing a mapping database stored in the server local storage 750.

The server local storage 750 can store the server software 752, mapping data, routing data, profile data, setup data, multimedia data, traffic information, points of interest, photos, text, audio data, video data, or any combination thereof for the operation of the second device 706. The server local storage 750 can include a memory storage device, such as a disk drive, storage array, network storage, solid-state memory devices, optical storage, magnetic storage, bubble memory, volatile memory, nonvolatile memory, internal memory, external memory, database, or a combination thereof.

Figure 8:
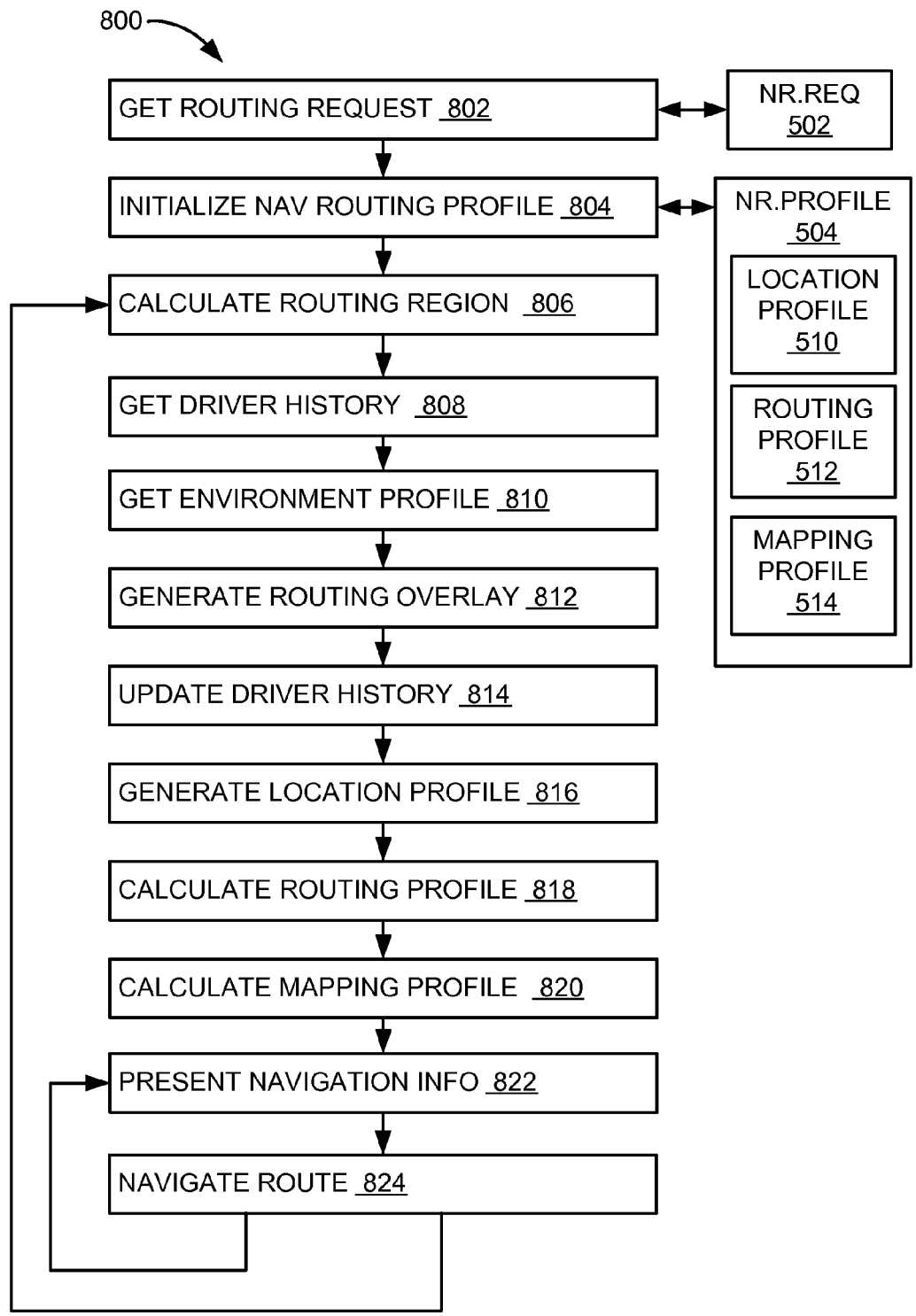
FIG. 8 is a flow chart of a navigation system with location profiling in a third embodiment of the present invention.

Referring now to FIG. 8, therein is shown a flow chart of a navigation system 800 with location profiling in a third embodiment of the present invention. For example, the navigation system 800 can be operated by running the software 614 of FIG. 6. As another example, the navigation system 800 can be operated by running the client software 714 of FIG. 7, the server software 752 of FIG. 7, or a combination thereof.

The navigation system 800 can calculate a route, such as the compensation route 210 of FIG. 2, and operate the display interface 202 of FIG. 2 by presenting navigation directions and mapping information for the compensation route 210. For example, the display interface 202 can show the compensation route 210 from the airport to a downtown hotel.

In the navigation system 800, as an example, each module is indicated by a number and successively higher module numbers follow one another. Control flow can pass from one module to the next higher numbered module unless explicitly otherwise indicated.

The navigation system 800 can receive the navigation routing request 502 of FIG. 5 to navigate from the start location 538 of FIG. 2 to the end location 540 of FIG. 5 in a get routing request module 802. Receiving the navigation routing request 502 can mark the start the navigation routing operation. Receiving the navigation routing request 502 can include the entry of the navigation routing request 502 on the first device 102 of FIG. 1. The navigation routing request 502 can be initiated by the driver and received by the navigation system 800 from the drive or can be initiated by the navigation system 800 itself.

The navigation system 800 can initialize the navigation routing profile 504 of FIG. 5 in an initialize navigation routing profile module 804. Initializing the navigation routing profile 504 can prepare the navigation system 800 for operation by clearing memory or configuring modules with the information from the navigation routing request 502. It is understood that the initialization functionality is optional.

Initializing the navigation routing profile 504 can include validating the information to perform a routing operation including the start location 538, the end location 540, the current location 532 of FIG. 5, the driver preference 548 of FIG. 5, or any combination thereof. Initializing the navigation routing profile 504 can also eliminate any pre-existing information associated with the navigation routing profile 504 and prepare the navigation system 800 to calculate a new route.

The navigation system 800 can calculate the routing region 520 of FIG. 5 using the current location 532 of FIG. 5 in a calculate routing region module 806. Calculating the routing region 520 represents the geographic region or area where the navigation routing will take place and allows the navigation system 800 to compare previous navigation routing operations within the routing region 520.

The routing region 520 identifies the general area where routing takes place and is used to determine if a driver has been in the routing region 520 before. Calculating the routing region 520 can be performed in a variety of methods. For example, the routing region 520 can be calculated using the current location 532 to determine the location of the first device 102 by setting the routing region 520 to the geographical coordinates of the current location 532.

As another example, the routing region 520 can be calculated by using the current location 532 as the start location 538 of FIG. 5 and setting the routing region 520 to the geographical coordinates of the mid-point between the start location 538 and the end location 540 of FIG. 5. The mid-point can be calculated by adding the individual longitude and latitude values of the two locations and dividing each by two to create a new longitude and latitude coordinate that is half-way between the two locations.

As yet another example, the routing region 520 can be represented by a pre-defined identifier that can represent a location, instead of using a geographical coordinate. The routing region 520 can be calculated by finding the pre-defined identifier that is closest to the current location 532. The pre-defined identifier can include city names, region names, or district names.

The navigation system 800 can retrieve the driver history 522 in FIG. 5 in a get driver history module 808. The driver history 522 allows the system to determine if the driver is familiar with the routing region 520. The driver history 522 describes previous instances where the driver has used the navigation system 100.

Retrieving the driver history 522 can include reading the driver history 522 from a memory such as a local storage, a remote storage, a database, a cache memory, or any combination thereof. The driver history 522 can be retrieved using the routing region 520 and the driver identification 542 in FIG. 5 to uniquely identify the driver history 522 for the driver as indicated by the driver identification 542 in the routing region 520.

The navigation system 800 can also calculate the familiarity level 544 of FIG. 5 based on the driver history 522 and the familiarity threshold 546 of FIG. 5. The familiarity level 544 can be calculated by taking the number of times the driver has navigated in the routing region 520 as indicated in the driver history 522 and comparing it with the familiarity threshold 546.

The familiarity threshold 546 can represent the minimum number of times the driver must have navigated in the routing region 520 to be familiar with the region. If the number of times the driver has navigated in the routing region 520 meets or exceeds the familiarity threshold 546, then the familiarity level 544 can indicate that the driver is familiar with the routing region 520.

Calculating the familiarity level 544 can also include varying the familiarity threshold 546. The familiarity threshold 546 can be varied to change the number of times the driver must have navigated in the routing region 520 to be familiar.

For example, in an easy to navigate the routing region 520, such as a small town, the familiarity threshold 546 could be set to a low value, such as two. After two times navigating in the small town, the navigation system 800 can indicate that the driver is familiar.

In another example, for a large city, such as New York or Los Angeles, the familiarity threshold 546 could be set to a higher value, such as 5, to indicate that the driver must have navigated in the routing region 520 at least five times to be considered familiar with the routing region 520.

The familiarity level 544 indicates the degree of knowledge and experience the driver has with the routing region 520. For example, the familiarity level 544 can indicate that the driver is either familiar or unfamiliar with the routing region 520. In another example, the familiarity level 544 can be expressed as a degree of familiarity and represented as a weighted value from one to ten where one can indicate the driver is unfamiliar with the routing region 520 and ten can indicate that the driver is very familiar with the routing region 520.

The navigation system 800 can retrieve the environment profile 524 of FIG. 5 in a get environment profile module 810. The environment profile 524 can allow the navigation system 800 to change routing behavior based on the current environment.

The environment profile 524 can indicate the current environmental factors that have an effect on streets and intersections associated with the routing region 520. The environment profile 524 can include general environmental factor such as weather conditions and temperature, as well as specific environmental factors, such as current traffic levels and road construction, that can affect individual streets in the routing region 520.

Retrieving the environment profile 524 can include reading the environment profile 524 from a memory such as a local storage, a remote storage, a database, a cache memory, or any combination thereof. The environment profile 524 can be retrieved using the routing region 520 to identify the environment profile 524.

For example, the environment profile 524 can indicate below-freezing temperatures in the routing region 520 and can include a lower routing weight for a street that is susceptible to icing. In another example, the environment profile 524 can indicate an intersection is undergoing construction work and can include lower routing weight for roads that are connected to the intersection.

The navigation system 800 can generate the routing overlay 526 of FIG. 5 based on the familiarity level 544 in a generate routing overlay module 812. The routing overlay 526 can allow the navigation system 800 to change routing behavior based on how familiar the driver is with the routing region 520.

The routing overlay 526 can be generated based on the familiarity level 544 being below the familiarity threshold 546. The routing overlay 526 can be used to compensate for the unfamiliarity of the driver at the routing region 520.

The routing overlay 526 can have the supplemental routing information 528 that can include routing weight values for the nodes and the edges. The routing overlay 526 can represent the physical navigable streets and intersections in the routing region 520 as the nodes and the edges of a directed graph.

Generating the routing overlay 526 can include reading the node and the edge information for the routing region 520 from a memory and updating the node and the edge information with the supplemental routing information 528. The memory can include a local storage, a remote storage, a database, a cache memory, or any combination thereof.

The routing weight of the node or the edge in the supplemental routing information 528 can indicate the desirability of routing along a particular street or intersection. The supplemental routing information 528 can be based on the routing region 520, the familiarity level 544 of FIG. 5, the environment profile 524, the driver preference 548 of FIG. 5, or any combination thereof.

The supplemental routing information 528 can be read from a memory such as a local storage, a remote storage, a database, a cache memory, or any combination thereof. Updating the supplemental routing information 528 of the routing overlay 526 can compensate for the unfamiliarity of the driver at the routing region 520, compensate for environmental effects and allow the driver to override the navigation system behavior.

For example, where the supplemental routing information 528 is based on the familiarity level 544, the node and the edge routing weights for a driver who is unfamiliar with the routing region 520 can include a higher routing weight for a major highway indicating that the highway is a better routing option for that driver. The supplemental routing information 528 can also include a lower routing weight for a residential road. This would make it more likely that the compensation route 210 calculated for the routing region 520 would include the major highway and not the residential road for the unfamiliar driver.

In another example, where the supplemental routing information 528 is based on the environment profile 524, the node and the edge routing weights can include a lower routing weight for the nodes and the edges that are affected by environmental factors, such as streets near the ocean or streets susceptible to flooding when the environment profile 524 indicates stormy weather.

When the environment profile 524 indicates that stormy weather and high tides are associated with the routing region 520, the weight of the nodes and the edges representing streets near the ocean can be reduced to indicate they are less desirable for routing. Changing the routing weights can include reducing the routing weights for the nodes and the edges that are negatively impacted by environmental factors and increasing the weights for those that are positively impacted.

In yet another example, where the supplemental routing information 528 is based on the driver preference 548, the node and the edge routing weights can include a higher routing weight for the nodes and the edges indicated by the driver preference 548. The routing overlay overriding the routing overlay 526 can include the driver preference 548 information to take precedence over the other routing information.

For example, if the driver preference 548 indicates that the driver wants a scenic route, then the supplemental routing information 528 can be updated to increase the routing weight of the nodes and the edges designated as part of a scenic route. Updating the supplemental routing information 528 can override the routing overlay 526 with the driver preference 548, resulting in a scenic route being selected.

The routing overlay 526 represents physical streets and intersections in the routing region 520. The routing overlay 526 can be used to generate the compensation route 210 that can be displayed on the display interface 202 of FIG. 2 to help the driver navigate from the start location 538 to the end location 540.

The navigation system 800 can update the driver history 522 in an update driver history module 814. Updating the driver history 522 can include adding information about the driver to the driver history 522 including writing the additional information to a memory. The memory can include a local storage, a remote storage, a database, a cache memory, or any combination thereof.

The driver history 522 can be updated with the driver identification 542 of FIG. 5, the routing region 520, the driver performance 536, or any combination thereof. For example, the driver history 522 can be updated with the routing region 520 by writing a record into the memory indicating the driver identification 542 and the routing region 520. Updating the driver history 522 with the routing region 520 can increment the count of times the driver has navigated in the routing region 520.

In another example, the driver history 522 can be updated with the driver performance 536 by writing into the memory indicating the driver identification and the driver performance 536. An update to the driver history 522 can indicate if the driver had problems while navigating in the routing region 520.

The navigation system 800 can generate the location profile 510 in a generate location profile module 816. The location profile 510 represents the information about the routing region 520 that allows the navigation system 800 to change routing behavior based on the location of the first device 102.

The location profile 510 is the location-specific routing information used to modify the default routing information 550 of FIG. 5 used to calculate the compensation route 210. The location profile 510 can be generated by concatenating together the individual elements used to modify the routing. The location profile 510 can include the routing region 520, the driver history 522, the routing overlay 526 with the supplemental routing information 528, the environment profile 524, or any combination thereof.

The navigation system 800 can calculate the routing profile 512 of FIG. 5 in a calculate routing profile module 818. Calculating the routing profile 512 allows the navigation system 800 to find the compensation route 210 representing the physical streets and intersections to be followed to navigate to the end location 540.

Calculating the routing profile 512 includes generating the compensation route 210 and retrieving related ancillary information, such as the navigation commands for each turn in the route, associated with the compensation route 210. The navigation system 800 can retrieve the route related information by reading the information from a memory using the compensation route 210 to identify the information.

The compensation route 210 can be generated by a variety of routing methods. The routing methods can include finding the route with the lowest cost, the shortest time, the fewest turns, or any combination thereof. For example, generating the compensation route 210 with the lowest cost can include adding up the routing weights of the nodes and the edges of each potential route to calculating a total routing weight and finding the route with the lowest total weight.

Generating the compensation route 210 can also include retrieving the default routing information 550, modifying the default routing information 550 with the supplemental routing information 528 of the location profile 510, and identifying the compensation route 210 from the start location 538 to the end location 540 based on the modified routing information.

The default routing information 550 can be retrieved by reading from a memory such as a local storage, a remote storage, a database, a cache memory, or any combination thereof. The default routing information 550 represents the routing weights for the nodes and edges associated with the streets and intersections in the routing region 520.

The default routing information 550 can be modified using the supplemental routing information 528 of the routing overlay 526 in the location profile 510. The supplemental routing information 528 represents additional location-specific routing weights for the nodes and edges of the routing region 520 that can be applied to the default routing information 550. For example, the routing weights for the particular node or edge in the supplemental routing information 528 can modify the default routing information 550 by adding the routing weight of the supplemental routing information 528 to the routing weight of the default routing information 550.

The compensation route 210 can also be generated from the default routing information 550. For example, the compensation route 210 can be calculated using the least cost routing method by searching the default routing information 550 for the route with the lowest total routing weight.

The navigation system 800 can calculate the mapping profile 514 of FIG. 5 in a calculate mapping profile module 820. Calculating the mapping profile 514 allows the navigation system 800 to display the images of the map of the physical region on the display interface 202 of FIG. 2. Calculating the mapping profile 514 can include determining the mapping data required for the compensation route 210, calculating the size and scale of the mapping data, retrieving mapping data from a memory, resizing mapping data to fit the display interface 202, and retrieving ancillary mapping information such as points of interest (POI).

For example, calculating the mapping profile 514 can include retrieving display tiles for the routing profile 512 that are the correct size for the display interface 202. This can include retrieving display tiles of different resolutions and scales for locations directly on or adjacent to locations in the routing profile 512.

The navigation system 800 can present the navigation routing profile 504 on the display interface 202 of FIG. 2 in a present navigation information module 822. Presenting the navigation routing profile 504 allows the driver to interact with the navigation system 800 to physically navigate the compensation route 210 to the end location 540.

Presenting the navigation routing profile 504 can include displaying the compensation route 210 and the mapping profile 514 on the display interface 202 and playing the audio information associated with the compensation route 210 on the display interface 202. The display interface 202 can present the visual and audio direction navigation information of the navigation routing profile 504.

For example, the mapping profile 514 can include display tiles which can be presented on the display interface 202 to show the map of the routing region 520 of the navigation system 800. In another example, the navigation routing profile 504 can include the navigation commands which can generate audio instructions on the display interface 202 telling the driver when to make a turn.

The navigation system 800 can be used to navigate a vehicle or a person in a navigate route module 824. Navigating the vehicle can include operating the vehicle along the compensation route 210 according to the navigation routing information presented on the display interface 202 from the start location 538 to the end location 540. The display interface 202 of the navigation system 800 can present the visual and audio navigational routing information from the navigation routing profile 504 to the driver using the navigation system 800.

During navigation, the navigation system 800 can detect the navigation event 506 resulting from a change of location. The navigation system 800 can determine if the current location 532 is on or off the compensation route 210 by comparing the current location 532 with the locations along the compensation route 210.

The navigation system 800 can update the driver performance 536 of FIG. 5 based on whether the navigation system 800 is on or off the compensation route 210. Updating the driver performance 536 can include modifying the driver performance 536 to indicate a lower level of performance due to the incorrect navigation.

The navigation system 800 can update the driver history 522 based on the driver performance 536. Updating the driver history 522 can include adding information about the current routing operation to the driver history 522. The driver history 522 can be updated with the routing region 520, the compensation route 210, the start location 538, the end location 540, the driver preference 548, the driver performance 536, the navigation event 506, routes, time, date, or any combination thereof.

The driver history 522 can be updated by writing information in the memory where the driver history is stored. For example, the driver history 522 can be updated indicating the routing region 520 with the current time and date. The next time the driver history 522 is retrieved, it can indicate that the number of times the driver has navigated in the routing region 520 has been incremented by one.

If the current location 532 is determined not on the compensation route 210, the navigation system 800 can create a new version of the navigation routing request 502 from the current location 532 to the end location 540 and pass control to the initialize navigation routing profile module 804. If the current location 532 is on the compensation route 210, then control can pass to the present navigation information module 822.

As an example, the first device 102 of FIG. 6 can implement the navigation system 800 with location profiling. Each module of the navigation system 800 can be implemented using a combination of function modules of the first device 102. As an example, the navigation system 800 can be operating by running the software 614 of FIG. 6.

The control unit 618 of FIG. 6 can execute the software 614 of FIG. 6 to operate the system. The user interface 612 of FIG. 6 can receive the navigation routing request 502 for the get routing request module 802. Receiving the navigation routing request 502 can include receiving the current location 532 from the location unit 616 of FIG. 6. The user interface 612 can present visual and audio information on the display interface 202 for the present navigation information module 822.

The profile engine 644 of FIG. 6 can calculate the routing region 520 in the calculate routing region module 806. The profile engine 644 can calculate the driver history 522 in the get driver history module 808. The profile engine 644 can calculate the environment profile 524 in the get environment profile module 810.

The profile engine 644 can generate the routing overlay 526 in the generate routing overlay module 812. The profile engine 644 can generate the location profile 510 in the generate location profile module 816.

The routing engine 646 of FIG. 6 can calculate the routing profile 512 in the calculate routing profile module 818. The routing engine 646 can calculate the routing profile 512 using the location profile 510 provided by the profile engine 644.

The mapping engine 648 of FIG. 6 can calculate the mapping profile 514 in the calculate mapping profile module 820. The mapping engine 648 can calculate the mapping profile 514 using the routing profile 512 provided by the routing engine 646.

The control unit 618 of FIG. 6 can present the navigation routing profile 504 on the display interface 202 in the present navigation information module 822. The display interface 202 can present visual and audio navigation information of the navigation routing profile 504.

The navigation system 800 can navigate the vehicle, user, or group from the start location 538 to the end location 540 in the navigate route module 824. The location unit 616 of FIG. 6 can detect a change of the current location 532 in the navigation event 506 of FIG. 5 and initiate the update of the display interface 202 as needed. If the new current location is on the compensation route 210, then control is passed back to the present navigation information module 822.

As another example, the functionality of the navigation system 800 can be distributed between several devices. The first device 702 can act as a client while the second device 706 can act as a server. Each module of the navigation system 800 can be implemented using a combination of function modules of the first device 702 and the second device 706. As an example, the navigation system 800 can be operating by running the client software 714 of FIG. 7 and the server software 752 of FIG. 7 or a combination thereof.

The client control unit 718 of FIG. 7 can execute the client software 714 of FIG. 7 to operate the system. The client user interface 712 of FIG. 7 can be used to create the navigation routing request 502 for the get routing request module 802. The client user interface 712 can receive the start location 538 and the end location from the driver. The client communication unit 722 of FIG. 7 can send the navigation routing request 502 via the communication path 704 of FIG. 7 to the second device 706 of FIG. 7.

The second device 706 can receive the navigation routing request 502 in the server communication unit 740 of FIG. 7. The server control unit 742 of FIG. 7 can store the navigation routing request 502 in the server local storage 750.

The server control unit 742 can create the navigation routing profile 504 in the initialize navigation routing profile module 804. The navigation routing profile 504 can be stored in the server local storage 750.

The server control unit 742 can send the navigation routing profile 504 to the profile engine 744 of FIG. 7 in the calculate routing region module 806. The profile engine 744 can calculate the routing region 520 using the navigation routing profile 504 and update the location profile 510.

The profile engine 744 of the second device 706 can retrieve the driver history 522 in the get driver history module 808. The profile engine 744 can update the navigation routing profile 504 with the driver history 522 including updating the driver history 522 with the routing region 520 or the driver performance 536.

The profile engine 744 can retrieve the environment profile 524 in the get environment profile module 810. The profile engine 744 can update the navigation routing profile 504 with the environment profile 524.

The profile engine 744 can calculate the routing overlay 526 in the generate routing overlay module 812. The profile engine 744 can update the navigation routing profile 504 with the routing overlay 526. The profile engine 744 can update the driver history 522 on the second device 706.

The profile engine 744 can generate the location profile 510 in the generate location profile module 816. The profile engine 744 can update the location profile 510 with the routing region 520, the driver history 522, the routing overlay 526, the environment profile 524, or any combination thereof.

The profile engine 744 can update the navigation routing profile 504 with the location profile 510. The server control unit 742 can retrieve the navigation routing profile 504 from the profile engine 744 and store it in the server local storage 750.

The server control unit 742 can send the navigation routing profile 504 to the routing engine 746 of FIG. 7 to calculate the routing profile 512 in the calculate routing profile module 818. The routing engine 746 can update the navigation routing profile 504 with the routing profile 512. The server control unit 742 can retrieve the navigation routing profile 504 from the routing engine 746 and store it in the server local storage 750.

The server control unit 742 can send the navigation routing profile 504 to the mapping engine 748 of FIG. 7 to calculate the mapping profile 514 in the calculate mapping profile module 820. The mapping engine 748 can update the navigation routing profile 504 with the mapping profile 514. The server control unit 742 can retrieve the navigation routing profile 504 from the mapping engine 748 and store it in the server local storage 750.

The server communication unit 740 can send the navigation routing profile 504 via the communication path 704 to the first device 702. The first device 702 can receive the navigation routing profile 504 in the client communication unit 722 and store it in the client local storage 720.

The first device 702 can present the navigation routing profile 504 on the display interface 202 of the client user interface 712 in the present navigation information module 822. The display interface 202 can present visual and audio navigation information of the navigation routing profile 504 including the mapping profile 514, the routing profile 512, the location profile 510, or any combination thereof.

The navigation system 800 can navigate the vehicle, user, or group from the start location 538 to the end location 540 in the navigate route module 824. The client location unit 716 of FIG. 6 can detect a change of the current location 532 in the navigation event 506 of FIG. 5. The first device 702 can transfer control to the present navigation information module 822 to update the display interface 202.

Figure 9:
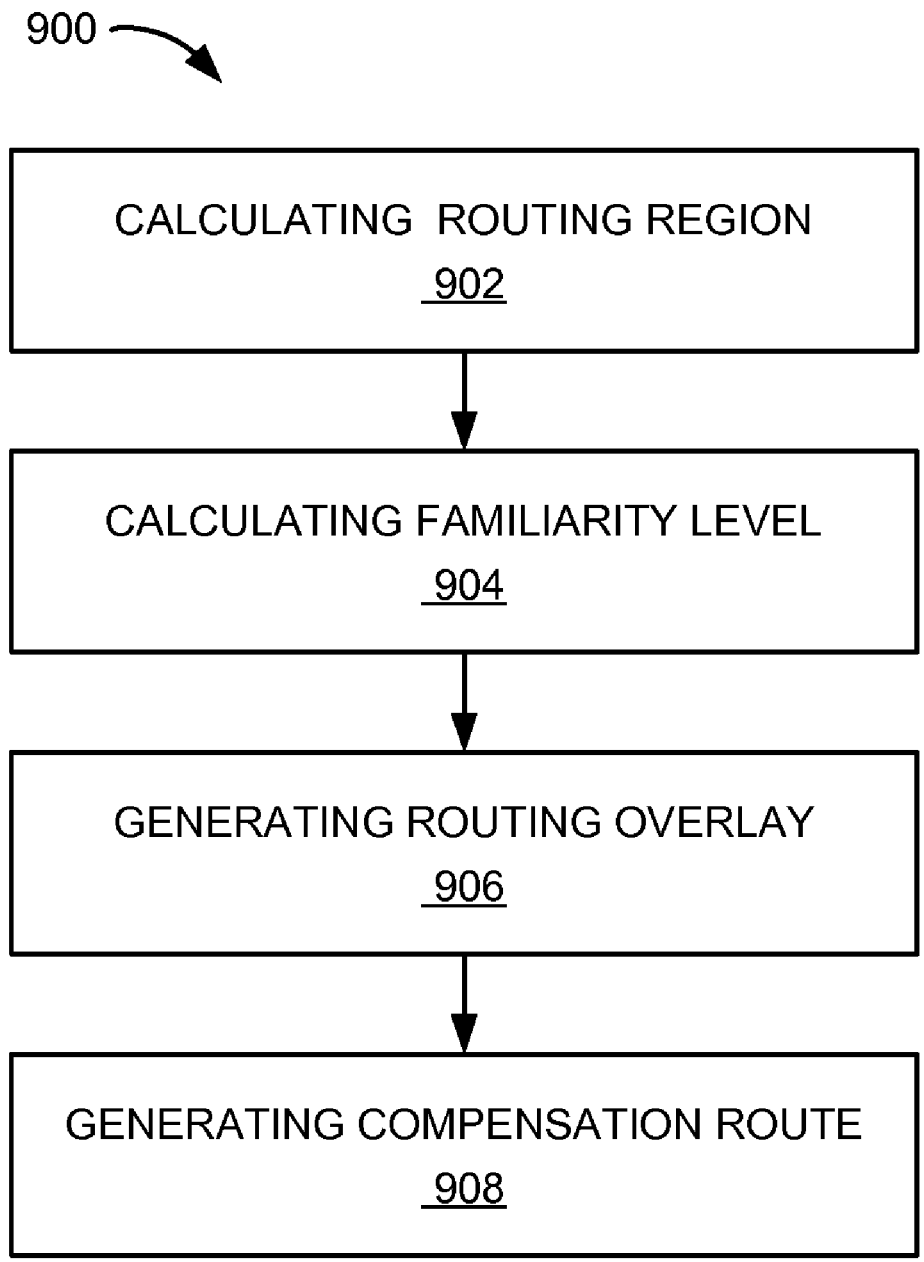
FIG. 9 is a flow chart of a method of operation of a navigation system with location profiling in a further embodiment of the present invention.

Referring now to FIG. 9, therein is shown a flow chart of a method 900 of operation of the navigation system 100 with location profiling in a further embodiment of the present invention. The method 900 includes: calculating a routing region based on a current location for locating a device in a block 902; calculating a familiarity level in a routing region in a block 904; generating a routing overlay based on the familiarity level below a familiarity threshold with the routing overlay to compensate for a driver unfamiliarity in the routing region in a block 906; and generating a compensation route based on the routing overlay for displaying on the device in a block 908.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system with location profiling of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   calculating, with a control unit a routing region based on a current location for locating a device, the routing region is a geographic area;
   calculating a familiarity level in the routing region;
   generating a routing overlay based on the familiarity level below a familiarity threshold with the routing overlay to compensate for a driver unfamiliarity in the routing region; and
   generating a compensation route from multiple routes in the routing region based on the routing overlay for displaying on the device.

2. The method as claimed in claim 1 wherein calculating the familiarity level in the routing region includes:
   retrieving a driver history for the routing region; and
   calculating the familiarity level based on the driver history below the familiarity threshold.

3. The method as claimed in claim 1 wherein calculating the familiarity level includes varying the familiarity threshold to compensate for the difficulty of the routing region.

4. The method as claimed in claim 1 wherein generating the routing overlay includes updating supplemental routing information based on an environment profile for the routing region for compensating for an environmental effect.

5. The method as claimed in claim 1 wherein generating the routing overlay includes:
   updating supplemental routing information based on a driver preference; and
   overriding the routing overlay with the driver preference.

6. A method of operation of a navigation system comprising:
   calculating, with a control unit a routing region based on a current location for locating a device, the routing region is a geographic area;
   retrieving a driver history for the routing region;
   varying a familiarity threshold based on the nature of the routing region;
   calculating a familiarity level for the routing region based on the driver history;
   generating a routing overlay based on the familiarity level below the familiarity threshold with the routing overlay to compensate for a driver unfamiliarity at the routing region; and
   generating a compensation route from multiple routes in the routing region based on the routing overlay for displaying on the device.

7. The method as claimed in claim 6 further comprising:
   detecting a navigation event for the current location;
   comparing the current location to the compensation route; and
   updating the driver history based on the current location not being on the compensation route.

8. The method as claimed in claim 6 further comprising updating the driver history with a driver performance along the compensation route.

9. The method as claimed in claim 6 wherein generating the compensation route based on the routing overlay includes generating the compensation route with the lowest cost based on the familiarity level.

10. The method as claimed in claim 6 wherein calculating the routing region based on the current location includes calculating the routing region based on a start location and an end location.

11. A navigation system comprising:
    a location unit for:
       calculating a current location for a device;
    a profile engine, coupled to the location unit, includes:
       a calculate routing region module for calculating a routing region based on the current location, the routing region is a geographic area,
       a get driver history module for calculating a familiarity level in the routing region, and
       a generate routing overlay module for generating a routing overlay having supplemental routing information based on the familiarity level being below a familiarity threshold with the routing overlay to compensate for an unfamiliarity of the driver at the routing region;
    a routing engine, coupled to the profile engine, for:
       generating a compensation route from multiple routes in the routing region based on the routing overlay; and
    a control unit, coupled to the routing engine, for:
       sending the compensation route for displaying on a device.

12. The system as claimed in claim 11 wherein the get driver history module is for retrieving a driver history for the routing region and for calculating the familiarity level based on the driver history below the familiarity threshold.

13. The system as claimed in claim 11 wherein the profile engine is for varying the familiarity threshold to compensate for the difficulty of the routing region.

14. The system as claimed in claim 11 wherein the profile engine is for updating supplemental routing information of the routing region based on an environment profile for the routing region for compensating for an environmental effect.

15. The system as claimed in claim 11 wherein the generate routing overlay module is for updating the supplemental routing information based on a driver preference and for overriding the routing overlay with the driver preference.

16. The system as claimed in claim 11 wherein the get driver history module is for retrieving a driver history for the routing region, for varying the familiarity threshold based on the nature of the routing region, and for calculating the familiarity level for the routing region based on the driver history.

17. The system as claimed in claim 16 wherein:
    the location unit is for detecting a navigation event for the current location; and
    the control unit includes a navigate route module for comparing the current location to the compensation route and for updating the driver history based on the current location not being on the compensation route.

18. The system as claimed in claim 16 wherein the profile engine is for updating the driver history with a driver performance along the compensation route.

19. The system as claimed in claim 16 wherein the routing engine is for generating the compensation route with the lowest cost based on the familiarity level.

20. The system as claimed in claim 16 wherein the profile engine is for calculating the routing region based on a start location and an end location.

* * * * *